United States Patent [19]

Ackermann

[11] 4,218,066
[45] Aug. 19, 1980

[54] ROTARY SEAL

[75] Inventor: William Ackermann, East Hartford, Conn.

[73] Assignee: United Technologies Corporation, Hartford, Conn.

[21] Appl. No.: 669,424

[22] Filed: Mar. 23, 1976

[51] Int. Cl.³ .............................................. F16J 15/44
[52] U.S. Cl. ..................................... 277/53; 277/215; 415/172 A; 415/174
[58] Field of Search .................... 277/53, 215, DIG. 6, 277/96 R, 96 B, 55, 74, DIG. 1; 415/174, 172 A

[56] References Cited

U.S. PATENT DOCUMENTS

| | | | |
|---|---|---|---|
| 2,963,268 | 12/1960 | Smile et al. | 277/53 |
| 3,146,992 | 9/1964 | Farrell | 415/174 |
| 3,339,933 | 9/1967 | Foster | 277/53 |
| 3,365,172 | 1/1968 | McDonough et al. | 277/53 |
| 3,603,599 | 9/1971 | Laird | 415/174 |
| 3,719,365 | 3/1973 | Emmerson et al. | 277/53 |
| 3,728,039 | 4/1973 | Plemmons et al. | 415/174 |

FOREIGN PATENT DOCUMENTS 855040  11/1960  United Kingdom ............. 277/DIG. 1

*Primary Examiner*—Richard E. Aegerter
*Attorney, Agent, or Firm*—Robert C. Walker

[57] ABSTRACT

Apparatus for impeding the leakage of a gaseous medium between the rotating and stationary components of a machine is disclosed. Various construction details which are specifically adapted for use in gas turbine engines are developed. Wide channel type sealing techniques are discussed in combination with honeycomb facing materials.

16 Claims, 5 Drawing Figures

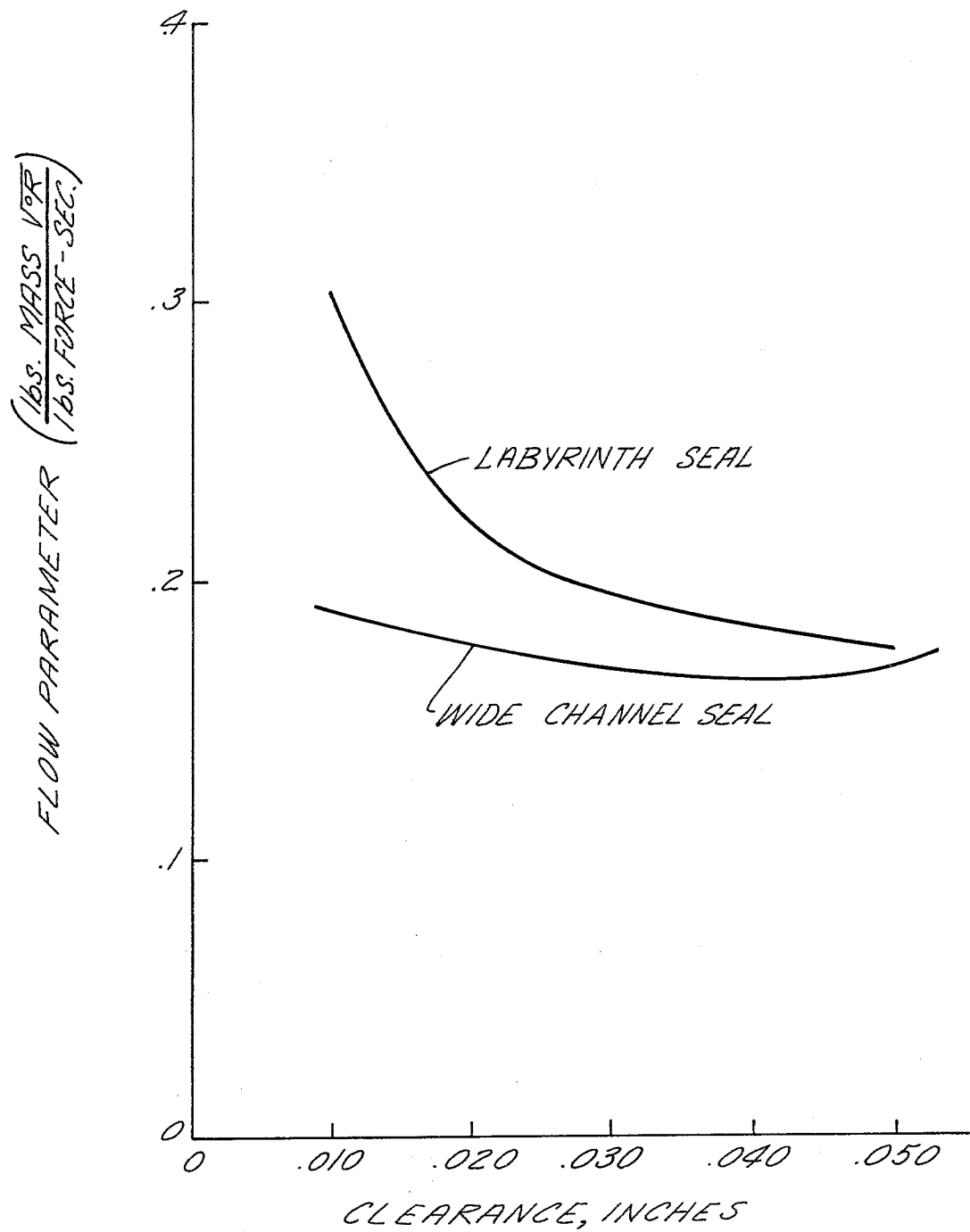

ROTARY SEAL

BACKGROUND OF THE INVENTION

1. Field of the Invention

This invention relates to rotary machines and particularly to wide channel type seals between the rotating and stationary components of a machine.

2. Description of the Prior Art

Rotary seals are conventionally disposed between the rotating and stationary components of a rotary machine to impede the leakage of a fluid medium therebetween. Labyrinth seals are widely used with gaseous mediums to reduce the kinetic energy of the leakage fluid by throttling and expanding the medium. Labyrinth seals are formed of a sealing surface or land on one component and a restrictive ring on an opposing component wherein the ring projects into close proximity with the land. A plurality of restrictive rings are commonly required in series to effect sufficient energy dissipation.

In gas turbine engines labyrinth seals are typically used to prevent the excessive leakage of air into the bearing compartments and to prevent the excessive leakage of air externally of the working medium flow path from one engine stage to another. One construction for sealing between adjacent stages in the turbine section of an engine is shown in U.S. Pat. No. 3,514,112 to Pettengill entitled "Reduced Clearance Seal Construction." A plurality of restrictive rings in Pettengill project toward corresponding sealing surfaces. A throttle aperture is formed between each ring and its corresponding sealing surface. An expansion chamber is formed between each pair of adjacent rings. Air leaking through the first throttle aperture flows through the downstream chambers and apertures to establish a stable pressure differential across each ring of the labyrinth.

Labyrinth sealing is an effective technique for impeding the flow of a gaseous medium from a region of higher pressure in a gas turbine engine to a region of lower pressure at moderate clearance levels between relatively rotating components. Where a lesser clearance can be provided a second type of rotary seal, a "wide channel seal," is more effective than the labyrinth seal at an equivalent clearance. A wide channel seal is formed of two concentric cylindrical lands, one integrally mounted with the rotating component and one integrally mounted with the stationary component. The lands are closely spaced in opposing relationship to restrict the flow of the fluid medium between the two components by imposing frictional flow losses on the medium. One of the lands conventionally is covered with a honeycomb material to greatly increase flow turbulence within the channel.

Wide channel seals are less costly to manufacture and offer a weight saving when compared to labyrinth seals. Significant technical effort is being directed, therefore, to extending the clearance range of effective wide channel seals to make such seals suitable for use in engines requiring seal clearances of varied dimensions.

SUMMARY OF THE INVENTION

A primary aim of the present invention is to minimize the leakage of a fluid medium between the rotating and stationary elements of a rotary machine. Aerodynamic resistance to flow in a seal which is effective over a varied clearance dimension is sought. In one aspect of the invention, a specific object is to provide a seal structure having low resistance to abrasion while maintaining preferred structural characteristics.

According to the present invention, a wide channel type seal between two components adapted for relative rotations is formed of a honeycomb cylindrical surface on one component and a relatively smooth cylindrical surface on the opposing component wherein the cells of the honeycomb surface are canted in the upstream direction with respect to the flow across the seal.

In accordance with one embodiment of the invention, the cylindrical surface is coated with an abrasive material to encourage abrasion without excessive local heating of the opposing honeycomb material.

A primary feature of the present invention is the wide channel type seal which is disposed between the rotating and stationary components of a rotary machine. One of the channel forming members is fabricated from a honeycomb type material in which the cells of the honeycomb are canted in the upstream direction with respect to leakage flow across the seal. In one embodiment, the opposing channel forming member is coated with an abrasive material.

A principal advantage of the present invention is improved resistance to leakage flow. Destructive interference between the relatively rotating components is avoided through the use of the low density, honeycomb material. Improved resistance to cellular deformation is found in at least one embodiment incorporating an abrasive coating on the relatively smooth, cylindrical surface. Tight clearances are employable without fear of cellular deformation as the honeycomb material abrades. Increased aerodynamic resistance to flow is imposed against the leakage medium as strong local vortices are generated in the canted cells.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 4 is a graph showing comparative leakage characteristics between a labyrinth type seal and a wide channel type seal constructed in accordance with the present invention.

DESCRIPTION OF THE PREFERRED EMBODIMENT

Figure 1:
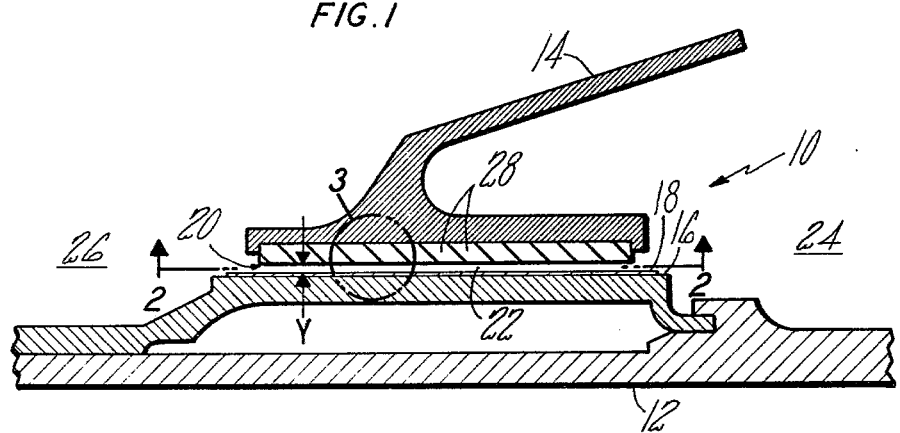
FIG. 1 is a partial sectional view taken through a wide channel seal constructed in accordance with the present invention.
Figure 3:
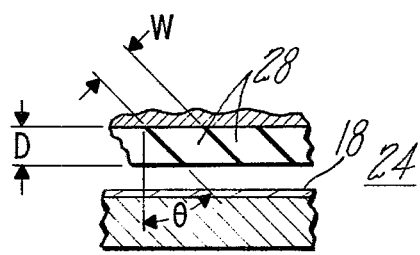
FIG. 3 is an enlarged view of the area 3 as shown in FIG. 1.

A wide channel type seal 10 is shown in FIG. 1 between the relatively rotating components of a rotary machine. The seal is formed between a rotating or rotor assembly 12 and a stationary or stator assembly 14. A cylindrical seal land 16 having an abrasive coating 18 affixed to the surface thereof is supported by the rotor 12. A cylindrical honeycomb strip 20 is attached to the stator 14 and radially opposes the coated surface of the land 16 to form an annular channel 22 therebetween. The seal separates a region of higher pressure 24 from a region of lower pressure 26. The honeycomb strip comprises a multiplicity of individual cells 28 which are open to the channel 22. The cells are canted in the direction of the higher pressure region 24 to an angle $\theta$ and are constructed with a cell width W as is shown in FIG. 3.

During the operation of a machine in which the wide channel seal 10 is incorporated, the pressure differential between the higher pressure region 24 and the lower pressure region 26 causes the fluid in the higher pressure region to flow through the annular channel 22. Strong local vortices are generated within each cell 28 as the fluid passes the cell openings. The vortices extend into the channel 22 to cause circumferential deflection of the flowing fluid. The circumferential deflection imposes a substantial increase in the pressure drop across the channel when compared to a seal construction confining pure axial flow.

The cells are canted into an angle $\theta$ in the direction of the higher pressure region 24. Canting the cells encourages the formation of the vortices by orienting the cell walls at an angle to the approaching flow. In one construction an angle $\theta$ of approximately forty-five degrees (45°) was found to be particularly effective although a substantial deviation on either side of forty-five degrees (45°) is expected to produce improved resistance to flow when compared to wide channel honeycomb seal structures having cells which are oriented perpendicularly to the flow through the channel.

Figure 2:
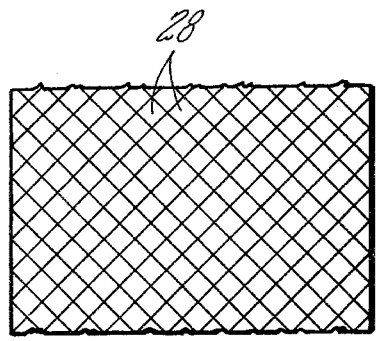
FIG. 2 is a directional view taken along the line 2—2 as shown in FIG. 1.
Figure 2A:
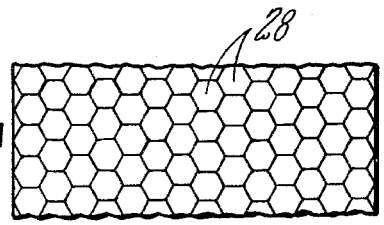
FIG. 2A is a directional view of an alternate cell structure taken along the line 2—2 as shown.

The honeycomb cells shown in the drawing have a diamond shaped cross section as viewed in FIG. 2 from the axis of the seal. The diamond shape is representative of cell patterns in which the vortex generating cavities are staggered with respect to the flow through the channel. The staggered cell pattern increases the impending effect of each vortice over the effect that is obtainable with axially aligned vortices. Other staggered geometrics such as one employing the hexagonal cross section of FIG. 2A are correspondingly effective. The concepts disclosed herein, however, are not exclusively limited to staggered geometrics.

Tight clearance control between the relatively rotating components of a machine is obtainable with apparatus constructed in accordance with the concepts taught herein. The honeycomb structure has a very low density and is abradable during operation of the machine. The initial channel width Y, as shown in FIG. 1, is set at less than the expected relative radial excursion of the rotor 12 so that at the condition of maximum excursion the seal land 16 abrades the outer portion of the honeycomb strip 20 to provide a zero (0) clearance at maximum rotor excursion.

Damage to the honeycomb structure during interference between the strip 20 and the land 16 is minimized on one construction wherein the abrasive coating 18 is affixed to the inwardly facing surface of the land 16. The abrasive coating severs the interfering honeycomb from the remaining structure to avoid the deformation of material into the cell openings and the resultant decrease in the strength of the vortices generated by the deformed structure. Silicon carbide and aluminum oxide have been found to be effective abrasive materials, although other coatings having similar qualities are expected to produce comparable results.

The depth D of the individual cells is optimized for each cell width W to provide a structure which generates strong local vortices. For a cell width of one quarter ($\frac{1}{4}$) of an inch, a depth of approximately one hundred thousandths (0.100) of an inch is effective. For a cell width of one eighth ($\frac{1}{8}$) of an inch, a depth of approximately sixty thousandths (0.060) of an inch is effective.

The FIG. 4 graph demonstrates the decreased leakage rate of a honeycomb wide channel type seal having cells canted in accordance with the present invention when compared to a honeycomb land labyrinth type seal having four restrictive rings. Both seals have an overall axial length of two (2) inches and separate regions having a pressure ratio of 1.5 therebetween. As is discernible from the graph, the wide channel seal exhibits dramatically improved sealing effectiveness at clearances less than fifty thousandths (0.050) of an inch.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. In combination with the rotor and stator assemblies of a rotary machine, a seal structure for impeding the leakage of a gaseous medium between said assemblies wherein said structure comprises a cylindrical seal land extending from the rotor assembly and a cylindrical honeycomb faced land extending from the stator assembly into close proximity with the seal land of the rotor assembly forming, therewith, an annular channel separating the rotor and stator assemblies of the machine, said honeycomb material having a multiplicity of cells which are canted in the upstream direction with respect to the anticipated direction of flow through the channel during operation of the machine to encourage the generation of local vortices within the channel for impeding said leakage of gaseous medium between the rotor and stator assemblies.

2. The invention according to claim 1 wherein the cells of the honeycomb material are canted to an angle of forty-five degrees (45°) with respect to said anticipated direction of flow.

3. The invention according to claim 1 wherein said seal land of the rotor assembly has a relatively smooth cylindrical surface.

4. The invention according to claim 1 wherein said formed annular channel has an axial length of approximately two inches.

5. The invention according to claim 1 wherein said cells of the honeycomb material have a depth of approximately one hundred thousandths (0.100) of an inch and a cell width of approximately two hundred fifty thousandths (0.250) of an inch.

6. The invention according to claim 1 wherein said cells of the honeycomb material have a depth of approximately sixty thousandths (0.060) of an inch and a cell width of approximately one hundred twenty-five thousandths (0.125) of an inch.

7. The invention according to claim 1 wherein said cells of the honeycomb material have a diamond shape.

8. The invention according to claim 1 wherein said cells of the honeycomb material have a hexagonal shape.

9. The invention according to claim 1 wherein said seal land has affixed thereto an abrasive coating which is adapted to wear the honeycomb land upon interference rather than deform the honeycomb cellular structure.

10. The invention according to claim 9 wherein said abrasive coating includes silicon carbide.

11. The invention according to claim 9 wherein said abrasive coating includes aluminum oxide.

12. A seal structure for impeding the leakage of a gaseous medium within a turbine engine from a region of higher pressure to a region of lower pressure, comprising:
 a first cylindrical seal land; and
 a second cylindrical seal land which radially opposes said first land forming an annular channel therebetween which axially separates the region of higher pressure from the region of lower pressure, and wherein the second land has affixed thereto a honeycomb material so oriented as to cant the cells of the honeycomb material in the direction of the higher pressure region.

13. The invention according to claim 12 wherein the cells of the honeycomb material have a diamond shaped cross section including a cell width of approximately one quarter (¼) of an inch and a cell depth of approximately one tenth (1/10) of an inch and wherein the cells are canted to an angle of approximately forty-five degrees (45°) in the direction of the higher pressure region.

14. The invention according to claim 12 wherein said seal land has affixed thereto an abrasive coating which is adapted to wear the honeycomb land upon interference rather than deform the honeycomb cellular structure.

15. The invention according to claim 14 wherein said abrasive coating includes silicon carbide.

16. The invention according to claim 14 wherein said abrasive coating includes aluminum oxide.

* * * * *

UNITED STATES PATENT AND TRADEMARK OFFICE
CERTIFICATE OF CORRECTION

PATENT NO. : 4,218,066
DATED : August 19, 1980
INVENTOR(S) : William Ackermann

It is certified that error appears in the above-identified patent and that said Letters Patent are hereby corrected as shown below:

Column 3, lines 35 & 36    "impending" should be -- impeding--

Signed and Sealed this

Thirty-first Day of March 1981

[SEAL]

Attest:

RENE D. TEGTMEYER

Attesting Officer    Acting Commissioner of Patents and Trademarks